No. 636,694. Patented Nov. 7, 1899.
E. F. PFLUEGER.
FISH DECOY.
(Application filed June 15, 1899.)
(No Model.)
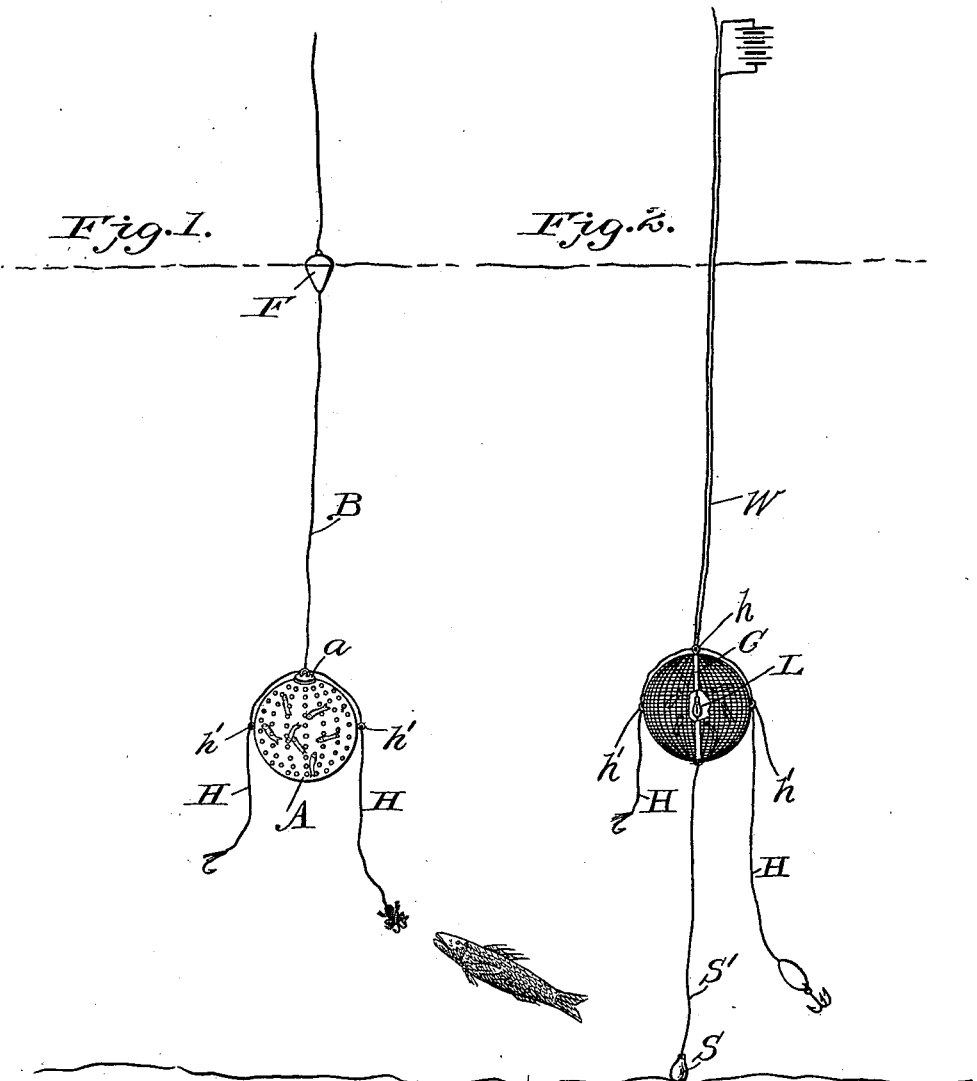
WITNESSES:
Edwin G. McKee.
G. M. Anderson
INVENTOR
E. F. Pflueger
BY
E. W. Anderson
his ATTORNEY.
THE NORRIS PETERS CO., PHOTO-LITHO., WASHINGTON, D. C.

UNITED STATES PATENT OFFICE.

ERNEST F. PFLUEGER, OF AKRON, OHIO.

FISH-DECOY.

SPECIFICATION forming part of Letters Patent No. 636,694, dated November 7, 1899.

Application filed June 15, 1899. Serial No. 720,693. (No model.)

*To all whom it may concern:*

Be it known that I, ERNEST F. PFLUEGER, a citizen of the United States, and a resident of Akron, in the county of Summit and State of Ohio, have invented certain new and useful Improvements in Fish-Decoys; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side elevation of the invention, showing it as in application. Fig. 2 is a similar view showing a modification of the invention. Fig. 3 is an enlarged side elevation of wire-mesh cage, showing incandescent lamp therein. Fig. 4 is a detail view of spring-catch device D. Fig. 5 is a sectional detail view showing sections of cage nested.

This invention has relation to fishing-tackle, and is designed to provide a decoy of novel and effective character for use in connection with the hooks and bait for alluring and attracting the fish thereto.

To this end the invention consists in a perforated cage or inclosure suspended within the water in connection with and adjacent to the hooks and bait and designed to contain minnows or other live bait. Means are also preferably employed in connection with the cage for guiding the hook-carrying lines and preventing them from becoming entangled.

The invention also embodies certain details of construction whereby the cage is adapted to be folded into more compact form when not in use, all as hereinafter described, and pointed out in the appended claims.

Referring to the accompanying drawings, the letter A designates a cage or inclosure. This may be constructed in various ways. It may consist of a perforated jar or globe, of glass or other transparent material, as shown in Fig. 1, with a removable metallic cap *a*, to which the line B is connected and which can be removed to permit insertion and removal of minnows or other live objects, or it may consist, as shown in Fig. 2, of a light woven-wire spherical or ovoidal structure of fine mesh and formed in two hemi-sections. The edges of these sections are reinforced by metal bands C C', one of which is made to overlap the other, the two sections being secured together by means of studs or rivets *c*, which may also serve as pivots, whereby one section may be turned half-way around and nested within the other section, as shown in Fig. 5. In all cases however, the sections are of scoop form, and being connected together at their meeting edges the bait contained in the cage is visible from all sides. Any suitable spring-catch device, such as shown, or nuts E threaded on the studs *c*, will serve to secure the sections against accidental displacement. In this construction the outer band C is provided with a ring *h*, to which the line B is connected. It is also provided with rings or eyes *h'*, which form guides for bait-carrying lines H, any suitable number of which may be employed.

H' designates the hooks and bait, which may be of any desired character.

F is a float connected to line B for use in still fishing. For trolling, a sinker S can be attached to the cage by a line S', and the float may or may not be used. I may also use within the cage for the purpose of attracting fish a small incandescent lamp L, which can be supplied with current by a wire W from a storage battery or other suitable source.

When made of wire or other metal, the cage should be painted or coated with some paint or material which will render it as far invisible when in the water as is possible.

Having thus described my invention, what I claim as new, and desire to secure by Letters Patent, is—

1. A decoy for fishing purposes, consisting of the globular receptacle or cage for live bait, having multitudinous perforations throughout substantially its entire surface and upon all sides thereof, the float, the connection between the float and cage, and means for attaching fishing-tackle thereto, substantially as specified.

2. A stationary decoy for fishing purposes, comprising the receptacle or cage for live bait, consisting of the scoop-form sections transparent throughout substantially their entire surface and upon all sides, means for connecting said sections together at their meeting edges, the float, the connection between said float and cage, and means for attaching fishing-tackle thereto, substantially as specified.

3. The herein-described decoy cage or inclosure for fishing purposes, consisting of foldable sections of wire cloth or netting, said sections having reinforced edges and connecting devices, and rings or eyes connected thereto and forming means for attaching and guiding a suspending-line and bait and hook carrying lines, substantially as specified.

In testimony whereof I affix my signature in presence of two witnesses.

ERNEST F. PFLUEGER.

Witnesses:
 T. W. WAKEMAN,
 H. D. HOSKELL.